United States Patent [19]

Anderson et al.

[11] 4,368,249
[45] Jan. 11, 1983

[54] PHOTOGRAPHIC PRODUCTS AND PROCESSES EMPLOYING NOVEL NONDIFFUSIBLE PYRIDYLAZO(DIALKYLAMINO)PHENOL MAGENTA DYE-RELEASING COMPOUNDS AND PRECURSORS THEREOF

[75] Inventors: Richard B. Anderson; Norman W. Kalenda, both of Rochester, N.Y.

[73] Assignee: Eastman Kodak Company, Rochester, N.Y.

[21] Appl. No.: 355,001

[22] Filed: Mar. 5, 1982

Related U.S. Application Data

[62] Division of Ser. No. 282,611, Jul. 13, 1981.

[51] Int. Cl.$^3$ .......................... G03C 1/40; C09B 45/00
[52] U.S. Cl. ................................... 430/17; 260/146 R
[58] Field of Search ............... 430/17, 222, 223, 226, 430/562; 260/146 R, 156

[56] References Cited

U.S. PATENT DOCUMENTS 2,864,813 12/1958 Bossard et al. ................. 260/146 R
3,051,697 8/1962 Lewis et al. .......................... 260/156
3,118,871 1/1964 Brody et al. ......................... 260/156
4,142,891 3/1979 Baigrie et al. ....................... 430/223

Primary Examiner—Richard L. Schilling
Attorney, Agent, or Firm—Harold E. Cole

[57] ABSTRACT

Photographic elements, diffusion transfer assemblages and processes are described which employ a novel nondiffusible compound having a releasable, pyridylazo(dialkylamino)phenol magenta dye moiety or precursor thereof, having the formula:

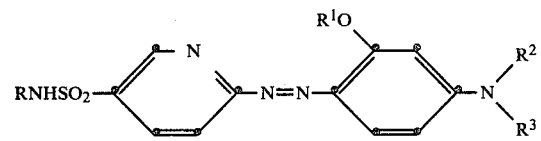

wherein:
(a) R represents hydrogen, a hydrolyzable moiety, or may be taken together with the NHSO$_2$ group to which it is attached to form CAR;
(b) R$^1$ represents hydrogen, a hydrolyzable moiety or CAR;
(c) R$^2$ and R$^3$ each independently represents hydrogen, CAR, an alkyl group of 1 to about 6 carbon atoms, or they can be taken together with the nitrogen to which they are attached to form a 5- or 6-membered heterocyclic ring, or one of R$^2$ and R$^3$ can be an aryl group having from 6 to about 10 carbon atoms; and
(d) CAR represents a ballasted carrier moiety capable of releasing the diffusible magenta dye moiety or precursor thereof under alkaline conditions;

with the proviso that at least one of R, R$^1$, R$^2$ and R$^3$ is CAR.

10 Claims, No Drawings

PHOTOGRAPHIC PRODUCTS AND PROCESSES EMPLOYING NOVEL NONDIFFUSIBLE PYRIDYLAZO(DIALKYLAMINO)PHENOL MAGENTA DYE-RELEASING COMPOUNDS AND PRECURSORS THEREOF

This is a division of application Ser. No. 282,611 filed July 13, 1981.

This invention relates to photography and more particularly to color diffusion transfer photography employing certain nondiffusible azo dye-releasing compounds which, as a function of development of a silver halide emulsion layer, release a diffusible metallizable, pyridylazo(dialkylamino)phenol magenta dye or precursor thereof. Highly stable metal complexes of this dye are formed during processing.

U.S. Pat. Nos. 4,142,891 of Baigrie et al relates to various nondiffusible azo dye-releasing compounds. It would be desirable to provide compounds with improved properties over those of Baigrie et al, such as better hue, less unwanted absorption, and narrower bandwidths.

U.S. Pat. Nos. 2,864,813, 3,051,697 and 3,118,871 relates to various 4-azoaniline dyes. These dyes, however, do not have chelating groups, carrier moieties, or the pyridylazo(dialkylamino)phenol ring structure of the compounds described herein. There is also no disclosure that these compounds could be used in photographic elements.

It would be desirable to provide improved dye-releasing compounds containing chelating dye moieties, so that the dye which is released imagewise during processing can diffuse rapidly to an image-receiving layer containing metal ions to form a metal-complexed, dye transfer image in a short amount of time which has better hues, less unwanted absorption and narrower bandwidths than those of the prior art, as well as good stability to heat, light and chemical reagents.

A photographic element in accordance with the invention comprises a support having thereon at least one photosensitive silver halide emulsion layer, the emulsion layer having associated therewith a dye image-providing material comprising a non-diffusible compound having a releasable, pyridylazo(dialkylamino)phenol magenta dye moiety or precursor thereof, the compound having the formula:

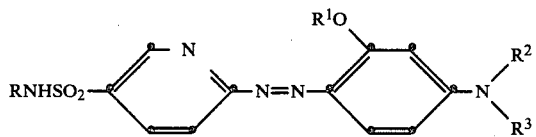

wherein:
(a) R represents hydrogen, a hydrolyzable moiety, or may be taken together with the NHSO$_2$ group to which it is attached to form CAR;
(b) R$^1$ represents hydrogen, a hydrolyzable moiety or CAR;
(c) R$^2$ and R$^3$ each independently represents hydrogen, CAR, an alkyl (including substituted alkyl) group of 1 to about 6 carbon atoms, or they can be taken together with the nitrogen to which they are attached to form a 5- or 6-membered heterocyclic ring, or one of R$^2$ and R$^3$ can be an aryl (including substituted aryl) group having from 6 to about 10 carbon atoms; and
(d) CAR represents a ballasted carrier moiety capable of releasing said diffusible magenta dye moiety or precursor thereof under alkaline conditions, e.g., as a function of development of the silver halide emulsion layer;

with the proviso that at least one of R, R$^1$, R$^2$ and R$^3$ is CAR.

In the above formula, the alkyl or substituted alkyl groups which R$^2$ and R$^3$ represent can be, for example, methyl, ethyl, propyl, isopropyl, cyanoethyl, sulfamoylpropyl or ethoxycarbonylmethyl. The aryl or substituted aryl groups which R$^2$ and R$^3$ represent can be, for example, phenyl, p-tolyl, m-hydroxyphenyl, m-chlorophenyl or 3-(3-hydroxyphenylsulfamoyl)phenyl.

In the above formula, R$^2$ and R$^3$ can be taken together with the nitrogen to which they are attached to form a 5- or 6-membered heterocyclic ring such as morpholine, pyrrolidine or piperidine.

In a preferred embodiment of the invention, R represents CAR, R$^1$ represents hydrogen and R$^2$ and R$^3$ each independently represents methyl or ethyl. In another preferred embodiment, R represents CAR, R$^1$ represents hydrogen, R$^2$ represents phenyl and R$^3$ represents hydrogen or methyl. In yet another preferred embodiment, R represents CAR, R$^1$ represents hydrogen and R$^2$ and R$^3$ form a 6-membered heterocyclic ring.

Other substituents may also be present in the two rings illustrated above, such as alkyl of 1 to 6 carbon atoms, alkoxy, halogens, solubilizing groups such as sulfonamido, sulfamoyl, phenylsulfamoyl, carboxy, sulfo or hydrolyzable precursors thereof.

In another embodiment of the invention, CAR may have attached thereto two azo dye moieties, as shown by the formula above, in which case two dye moieties will be released from one CAR moiety.

As stated above, R and R$^1$ each represent hydrogen, a hydrolyzable moiety or CAR. Hydrolyzable moieties which can be employed in our invention include esters such as acetate, benzoate, pivalate, carbamates, imidomethyl groups as described in Reczek and Welter, U.S. application Ser. No. 220,408, filed Dec. 29, 1980, or any of the blocking groups which can be cleaved by an intramolecular nucleophilic displacement reaction, as disclosed in Mooberry and Archie U.S. Ser. No. 949,462, filed Oct. 10, 1978, now U.S. Pat. No. 4,310,612, the disclosure of which is hereby incorporated by reference.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted carrier moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. Nos. 3,728,113 (dye released from a hydroquinonylmethyl quaternary salt); U.S. Pat. Nos. 3,719,489 and 3,443,941 (silver ion induced dye release); British Patent Publication 2,017,950A (dye released by a dye bleach process); U.S. Pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Patent 1,464,104; Research Disclosure 14447, April 1976; and U.S. Pat. Nos. 4,139,379 of Chasman et al (dye released by miscellaneous mechanisms), the disclosures of which are hereby incorporated by reference.

In a further preferred embodiment of the invention, the ballasted carrier moiety or CAR as described above may be represented by the following formula:

(Ballast-Carrier-Link)— wherein:

(a) Ballast is an organic ballasting radical of such molecular size and configuration as to render said compound nondiffusible in said photographic element during development in an alkaline processing composition;

(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

a(—C≡C)$_b$— wherein:
b is a positive integer of 1 to 2; and
a represents the radicals OH, SH, NH— or hydrolyzable precursors thereof; and (c) Link represents a group which, upon oxidation of said Carrier moiety, is capable of being hydrolytically cleaved to release the diffusible azo dye. For example, Link may be the following groups:

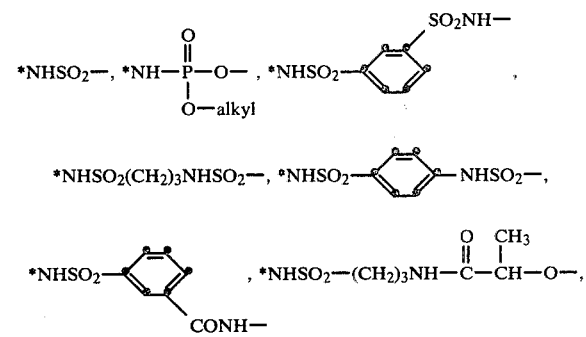

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms; a carbamoyl radical having 8 to 30 carbon atoms, such as —CONH(CH$_2$)$_4$—O—C$_6$H$_3$(C$_5$H$_{11}$)$_2$, or —CON(C$_{12}$H$_{25}$)$_2$; or a keto radical having 8 to 30 carbon atoms, such as —CO—C$_{17}$H$_{35}$ or —CO—C$_6$H$_4$(t—C$_{12}$H$_{25}$).

For specific examples of Ballast-Carrier moieties useful as the CAR moiety in this invention, reference is made to the November 1976 edition of Research Disclosure, pages 68 through 74, and the April 1977 edition of Research Disclosure, pages 32 through 39, the disclosures of which are hereby incorporated by reference.

In a highly preferred embodiment of the invention, the ballasted carrier moiety or CAR in the above formula is a group having the formula:

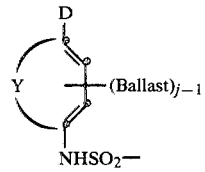

wherein:

(a) Ballast is an organic ballasting radical of such molecular size and configuration (e.g., simple organic groups or polymeric groups) as to render said compound nondiffusible in a photographic element during development in an alkaline processing composition;

(b) D is OR$^5$ or NHR$^6$ wherein R$^5$ is hydrogen or a hydrolyzable moiety, such as acetyl, mono-, di- or trichloroacetyl radicals, perfluoroacyl, pyruvyl, alkoxyacyl, nitrobenzoyl, cyanobenzoyl, sulfonyl or sulfinyl, and R$^6$ is hydrogen or a substituted or unsubstituted alkyl group of 1 to 22 carbon atoms, such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl or phenethyl (when R$^6$ is an alkyl group of greater than 8 carbon atoms, it can serve as a partial or sole Ballast);

(c) Y represents at least the atoms necessary to complete a benzene nucleus, a naphthalene nucleus, or a 5- to 7-membered heterocyclic ring, such as pyrazolone or pyrimidine; and (d) j is a positive integer of 1 to 2 and is 2 when D is OR$^5$ or when R$^6$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

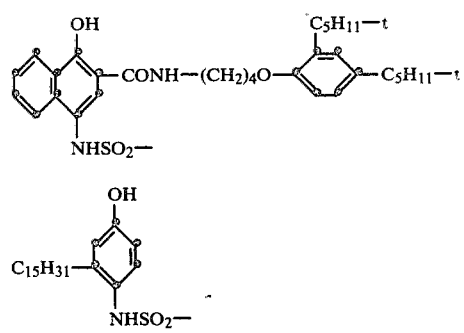

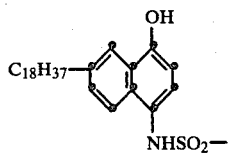

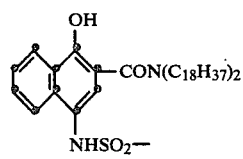

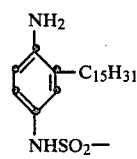

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

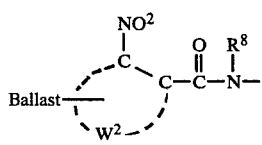

wherein:

Ballast is an organic ballasting radical of such molecular size and configuration as to render said compound nondiffusible in a photographic element during development in an alkaline processing composition;

$W^2$ represents at least the atoms necessary to complete a benzene nucleus (including various substituents thereon); and $R^8$ is an alkyl (including substituted alkyl) radical having 1 to about 4 carbon atoms.

Examples of the CAR moiety in this formula (I) include the following:

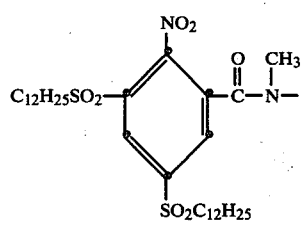

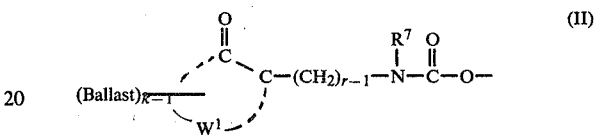

In a second embodiment of positive-working dye-release chemistry as referred to above, the ballasted carrier moiety or CAR in the above formulas may be a group having the formula:

$$\text{(Ballast)}_{k=1} \overset{\overset{O}{\parallel}}{\underset{W^1}{C}} C-(CH_2)_{r-1}-\overset{R^7}{\underset{}{N}}-\overset{O}{\underset{\parallel}{C}}-O- \quad \text{(II)}$$

wherein:

Ballast is an organic ballasting radical of such molecular size and configuration as to render said compound nondiffusible in a photographic element during development in an alkaline processing composition;

$W^1$ represents at least the atoms necessary to complete a quinone nucleus (including various substituents thereon);

r is a positive integer of 1 or 2;

$R^7$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^6$ is a radical of less than 8 carbon atoms.

Examples of the CAR moiety in this formula (II) include the following:

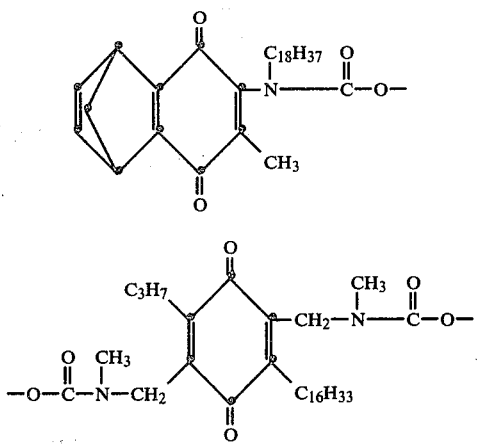

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

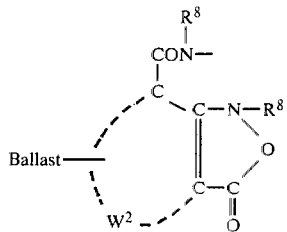
(III)

wherein:
Ballast, $W^2$ and $R^8$ are as defined for formula (I) above.

Examples of the CAR moiety in this formula (III) include the following:

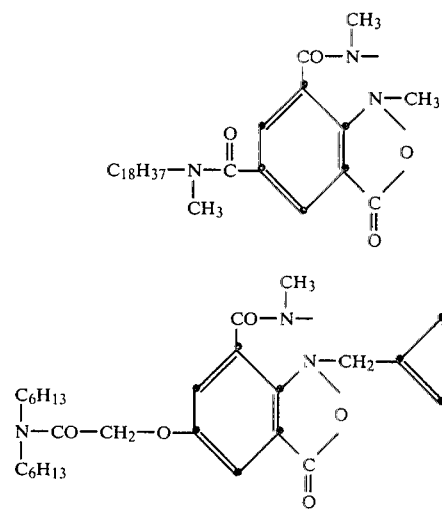

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

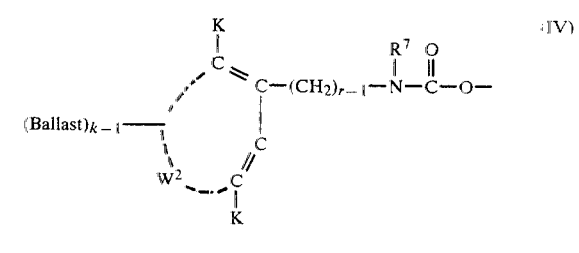
(IV)

wherein:
Ballast, r, $R^7$ and k are as defined for formula (II) above;
$W^2$ is as defined for formula (I) above; and
K is OH or a hydrolyzable precursor thereof.

Examples of the CAR moiety in this formula (IV) include the following:

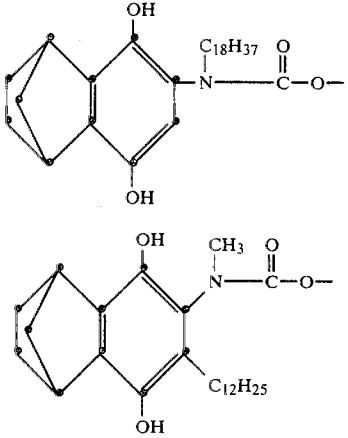

For further details concerning this particular CAR moiety, including synthesis details, reference is made to U.S. Pat. No. 3,980,479 of Fields et al, the disclosure of which is hereby incorporated by reference.

Representative compounds included within the scope of the invention include the following:

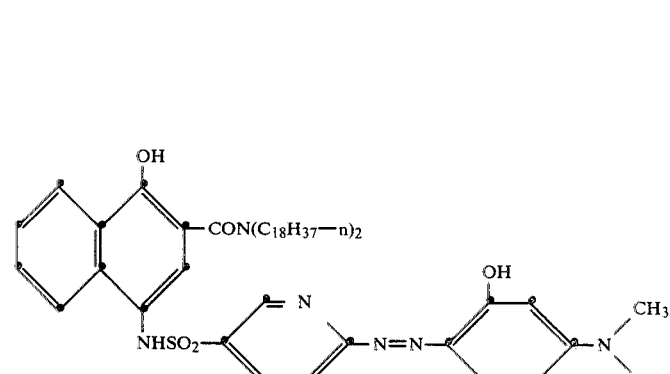
1)

(2)
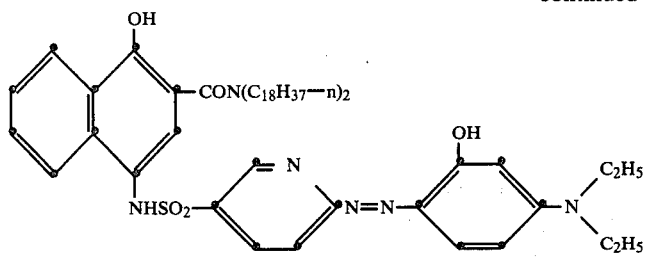
(3)
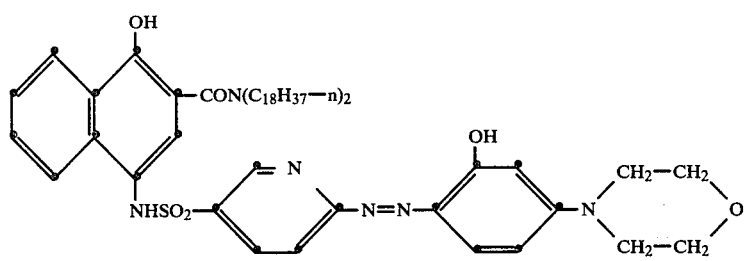
(4)
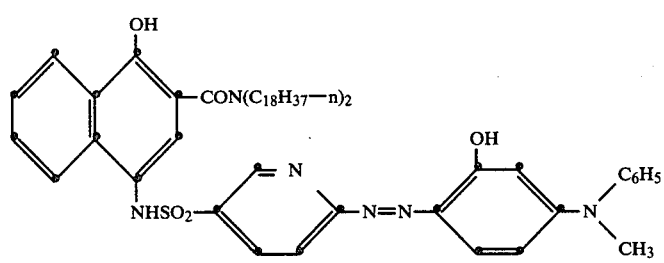
(5)
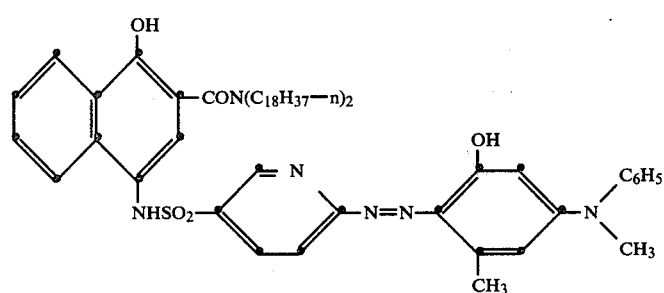
(6)
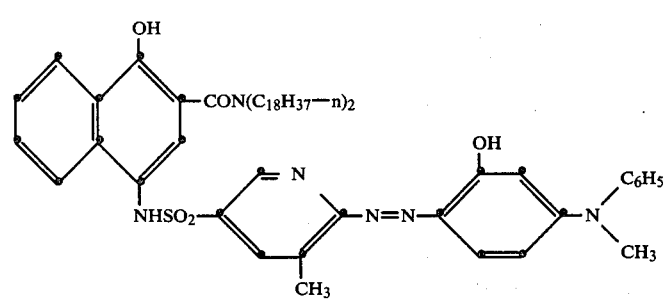
(7)
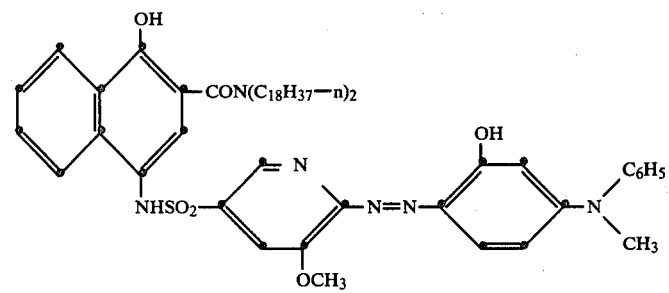

-continued
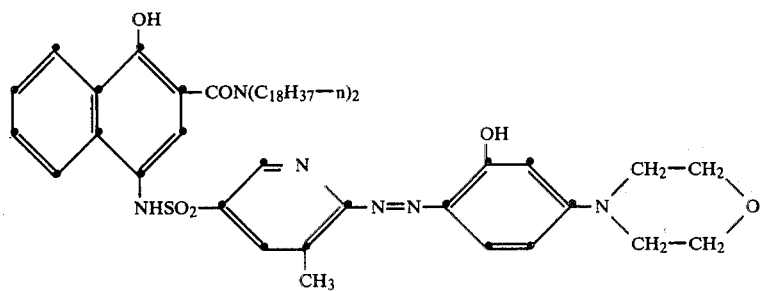 (8)
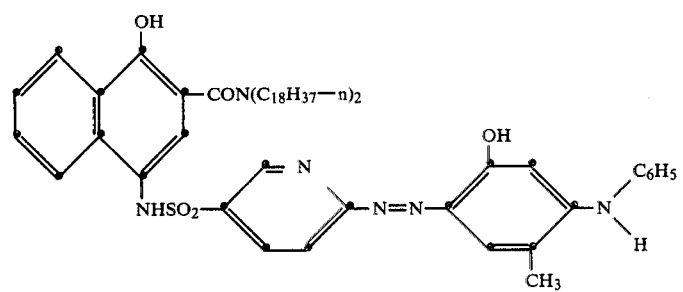 (9)
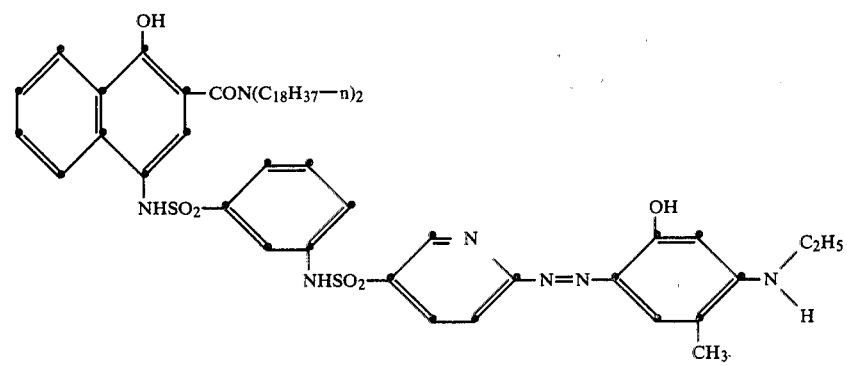 (10)
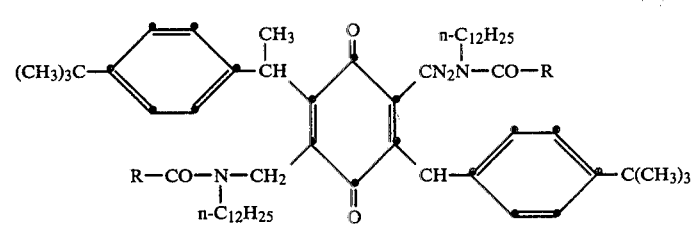 (11)–(13)
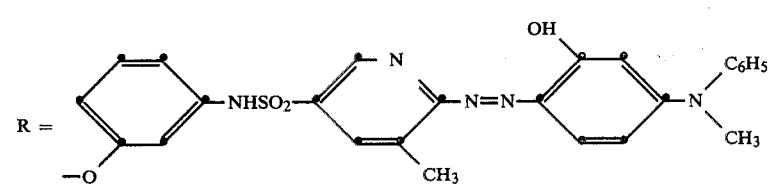 (11)
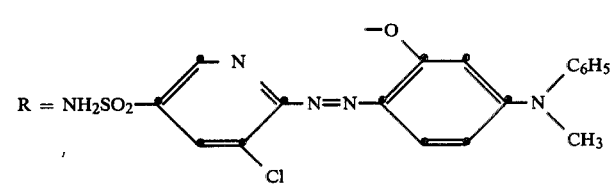 (12)

-continued

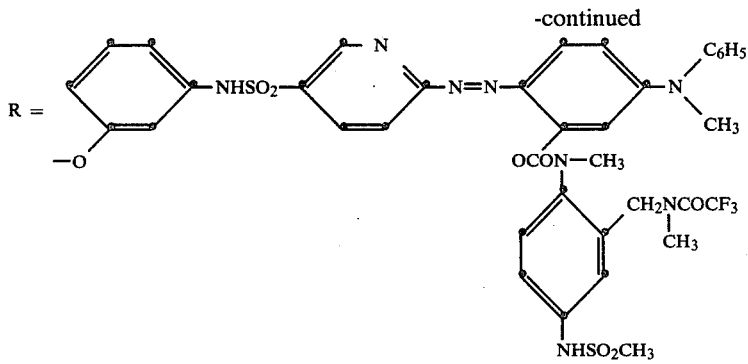

(13)

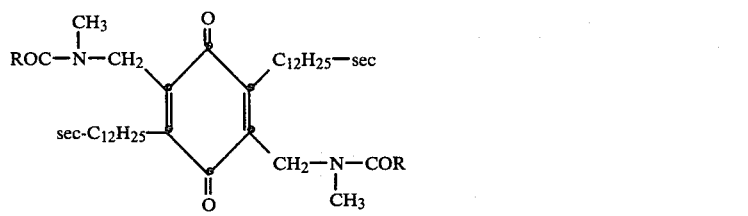

(14)-(16)

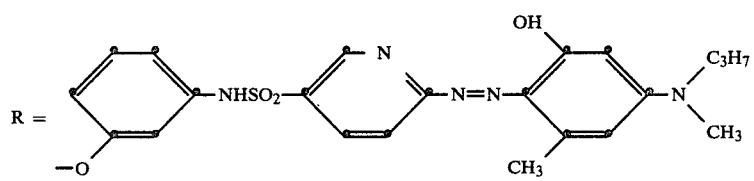

(14)

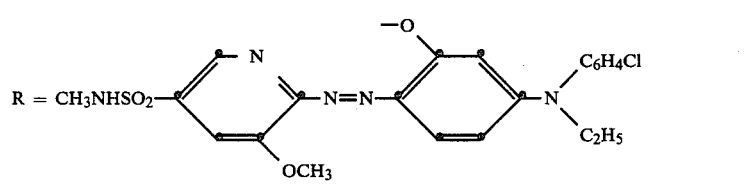

(15)

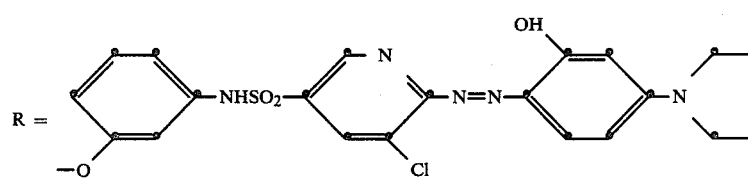

(16)

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible azo dye as described above imagewise as a function of the development of each of the silver halide emulsion layers;

(c) at least a portion of the imagewise distribution of the azo dye diffusing to a dye image-receiving layer; and (d) contacting the imagewise distribution of azo dye with metal ions, thereby forming a metal-complexed azo dye transfer image.

The tridentate azo dye ligand which is released from the dye-releasing compounds in accordance with the present invention will form a coordination complex in the image-receiving layer with polyvalent metal ions. The metal ions can be present in the image-receiving layer itself or in a layer adjacent thereto, or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II) and cobalt (II) ions.

For example, it is believed that the coordination complex which is formed from the tridentate azo dye ligand according to the invention in one of the preferred embodiments thereof has the following structure:

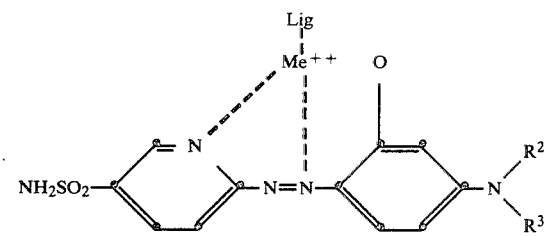

wherein:

$R^2$, and $R^3$ are as defined previously;

Me is metal; and

Lig is one or more ligand groups, depending upon the coordination number of the metal ion, such as $H_2O$, Cl or pyridine, or a second dye moiety.

Thus, in accordance with this preferred embodiment of the invention, a photographic element is provided which comprises a support having thereon a coordination complex of a polyvalent metal ion and a compound having the formula:

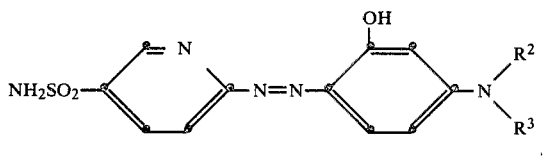

wherein:

$R^2$, and $R^3$ are as described above.

The element usually contains a photographic mordant or image-receiving layer to bind the dye or coordination complex thereto. The structures shown above may also, of course, be substituted in the same manner as described above for the starting compounds from which they are released.

It will be appreciated that, after processing the photographic element described above, there remains in it after transfer has taken place an imagewise distribution of azo dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element in the above-described process can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:
(1) a photographic element as described above; and
(2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in our invention is the liquid spreading means described in U.S. application Ser. No. 143,230 of Columbus, filed Apr. 24, 1980, now abandoned.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

In the embodiment described above, the dye image-receiving layer may itself contain metal ions or the metal ions may be present in an adjacent layer, so that the tridentate azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be formed in a typical camera used for in-camera processing, will effect a discharge of the container's contents between the image-receiving element and the outermost layer of the photographic element. After processing, the dye image-receiving element is separated from the photographic element.

In another embodiment, the dye image-receiving layer in the above-described film assemblage is integral with the photographic element and is located between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is employed is disclosed in Canadian Pat. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye-releasing compound as described above. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have the magenta or magenta-forming dye-releaser of the invention associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers at a concentration of about 0.1 to about 3 $g/m^2$ by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photo-sensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,N',N'-tetramethyl-p-phenylene-diamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4- dimethylphenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g, gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition *Research Disclosure*, the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing a pH in excess of 11, and preferably containing a developing agent as described previously. Suitable materials and addenda frequently added to such compositions are disclosed on pages 79 and 80 of the November 1976 edition of *Research Disclosure,* the disclosure of which is hereby incorporated by reference.

The alkaline solution-permeable, substantially opaque, light-reflective layer employed in certain embodiments of photographic film units used in this invention is described more fully in the November 1976 edition of *Research Disclosure,* page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of three primary regions of the spectrum can be disposed as a single segmented layer, e.g., as by the use of microvessels as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure,* Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Hue Test—Released Dyes

A receiving element was prepared comprising a poly(ethylene terephthalate) film support having thereon a nickel sulfate hexahydrate (0.58 g/m$^2$)-gelatin (1.08 g/m$^2$) metal complexing layer, and a poly(4-vinylpyridine)-gelatin mordant layer (each at 2.15 g/m$^2$).

The receiving element was immersed in an alkaline solution of the azo dyes listed in the Table below. The receiver was removed from the dye solution, washed in distilled water, placed in a pH 7.0 buffer solution and dried. Transmission spectra obtained on each sample were normalized to a density of 1.0 The $\lambda_{max}$ at maximum density, along with the "half band width" ($\frac{1}{2}$ BW), the wavelength range of the curve at half the maximum density, and the $\lambda\frac{1}{2}$, the center of the wavelength range at half the maximum density, are recorded in the Table below. A narrow $\frac{1}{2}$ BW generally designates a pure hue. With respect to those dyes which have two distinct maxima, the highest density $\lambda_{max}$ is given first.

A fading test was also run wherein the samples were mounted on aperture cards and subjected to 5000-foot-candle Xenon arc radiation (High Intensity Daylight or HID) for 10 and 21 days using a Wratten 2B filter. The curves were run against an undyed receiver as a reference. The percentage of dye left at each time interval was measured and recorded in the Table below.

TABLE

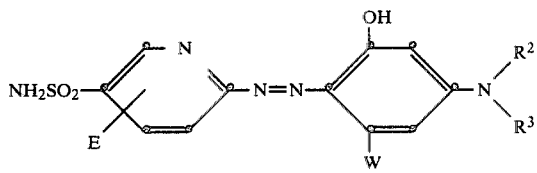

| Cmpd. | W | $R^2$ | $R^3$ | E | Hue (nm) @ pH 7 $\lambda_{\frac{1}{2}}$ (HBW) | $\lambda_{max}$ | Dye Stability 10 (21) Day HID % Dye Left |
|---|---|---|---|---|---|---|---|
| A | H | $CH_3$ | $CH_3$ | H | 536(88) | 565,530 | 96(94) |
| B | H | $C_2H_5$ | $C_2H_5$ | H | 538(89) | 532,563 | 95(91) |
| C | H | $-(CH_2)_2O(CH_2)_2-$ | | H | 539(101) | 536,566 | 93(92) |
| D | H | $C_6H_5$ | $CH_3$ | H | 544(102) | 540,572 | 95(94) |
| E | $CH_3$ | $C_6H_5$ | $CH_3$ | H | 532(113) | 530 | 89(84) |
| F | H | $C_6H_5$ | $CH_3$ | 3-$CH_3$ | 550(116) | 550 | 96(95) |
| G | H | $C_6H_5$ | $CH_3$ | 3-$OCH_3$ | 566(121) | 565,602 | 98(96) |
| H | H | $-(CH_2)_2O(CH_2)_2-$ | | 3-$CH_3$ | 545(110) | 543,576 | 94(92) |

The above results illustrate that the dyes of our invention have reasonably good hues and excellent light stability.

Synthetic Procedures

For the compounds listed in the Table above, a general procedure was used in which a catechol and a secondary amine react in the presence of an oxidant to form a 4-amino-1,2-benzoquinone. Examples of suitable secondary amines are dimethylamine, diethylamine, N-methylaniline, and morpholine. Silver oxide was the customary oxidant.

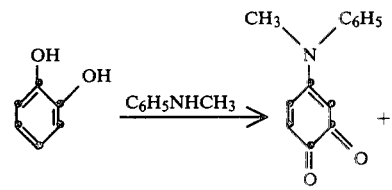

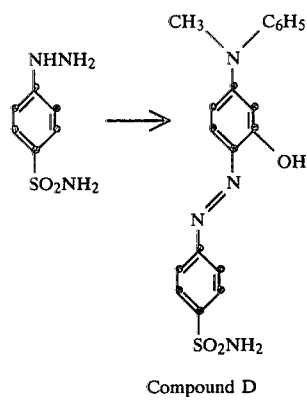

Compound D

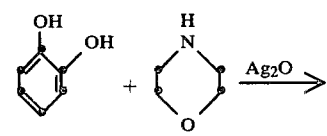

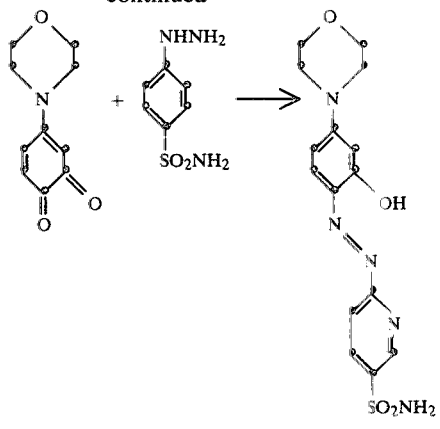

Compound C

EXAMPLE 2

Preparation of Compound 4

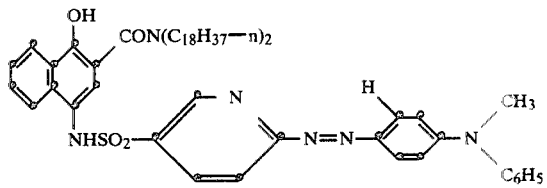

4-(2-Hydrazino-5-pyridinesulfonamido)-1-hydroxy-N,N-dioctadecyl-2-naphthamide (B) (36.52 g; 0.0413 mole) was slurried in acetic acid (450 ml) and warmed to about 55° C. to effect dissolution. The external heat was removed, and stirring was continued while adding 4-(N-methylanilino)-1,2-benzoquinone (A) (8.799 g; 0.0413 mole) in one portion. The reaction was stirred at room temperature for 4 hours then filtered and dried to yield 35 g. The crude material was dissolved in 10% ethyl acetate in methylene chloride (200 ml). About 10 g of pure product precipitated out. The filtrate was passed through a 1-meter silica gel chromatographic column to give an additional 4 g of product with mp 149°–151° C.

Intermediates:

A. 4-(N-Methylanilino)-1,2-benzoquinone

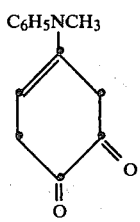

2.2 g (0.02 mole) catechol and 2.0 g (0.019 mole) N-methylaniline were dissolved in 80 ml acetone. Then 18.8 g (0.08 mole) silver oxide was added followed by 20 g anhydrous sodium sulfate. The mixture was stirred at room temperature for 10 minutes and filtered. The residue was washed with several portions of acetone totaling 50 ml. The filtrate was diluted with ligroin (bp 60°–80° C.) and the solid was filtered and washed with ligroin to give 2.6 g (60%). Thin-layer chromatography on Eastman chromogram silica gel sheets showed essentially a single spot with traces of impurities.

B. 4-(2-Hydrazino-5-pyridinesulfonamido)-1-hydroxy-N,N-dioctadecyl-2-naphthamide

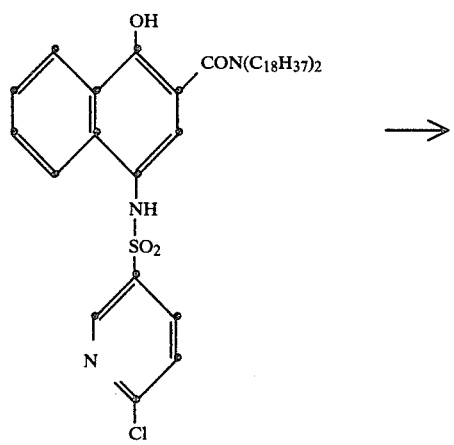

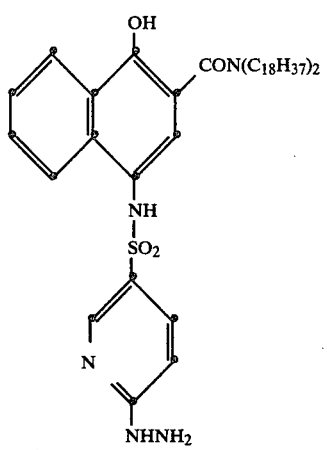

A mixture of 12.7 g (0.0144 mole) 4-(2-chloro-5-pyridinesulfonamido)-1-hydroxy-N,N-dioctadecyl-2-naphthamide, 4.7 g 95% hydrazine, and 413 ml methanol was heated under reflux for 17 hours. The hot mixture was filtered and then chilled. The product was filtered off, washed first with cold methanol, then with water, and air dried, yielding 11.7 g (93%), mp 96°–8° C. after softening. A thin-layer chromatogram using 85/15 methylene chloride/acetone to elute, showed traces of impurities.

C. 4-(2-Chloro-5-pyridinesulfonamido)-1-hydroxy-N,N-dioctadecyl-2-naphthamide

A solution of 17.0 g (0.024 mole) of 4-amino-1-hydroxy-N,N-dioctadecylnaphthamide (U.S. Pat. No. 4,135,929) and 240 ml tetrahydrofuran (THF) (dried over molecular sieves) was stirred at room temperature. Under nitrogen 4.5 g pyridine was added. This was followed by a filtered solution of 10.0 g (0.0377 mole) 2-chloropyridine-5-sulfonyl chloride in 80 ml THF and the mixture was stirred for 2¼ hours. Since at this point, a thin-layer chromatogram on Eastman Chromogram silica gel strips indicated no more unreacted aminonaphthol, the mixture was concentrated on a rotary evaporator to a small volume and diluted with water. The resulting two-phase mixture was extracted with methylene chloride and the extracts were combined and dried over anhydrous sodium sulfate. The dried extract was concentrated to a purple oil which solidified to a wax on standing. This wax was stirred vigorously with 600 ml of boiling acetonitrile, allowed to stand momentarily to allow the undissolved oil to settle and decanted. Chilling the extract gave 19.7 g of very pale purple product, mp 96°–8° C., which showed faint traces of impurities by the same thin-layer chromatographic procedure. A second extraction of the remaining purple oil with 200 ml boiling acetonitrile gave another 2.1 g of product as a pale lavender solid, mp 80°–3° C. Recrystallization of this fraction from 3A ethanol returned 2.0 product, no change in color, but mp 96°–7° C. Total yield was 12.7 g (60%).

D. 5-Chlorosulfonyl-2-chloropyridine

To 160 ml concentrated HCl was added 10.0 g (0.078 mole) 5-amino-2-chloropyridine and the solution cooled to −8° C. Sodium nitrite (5.37 g, 0.078 mole) in 20 ml H₂O was added below the surface of the solution at a rate to maintain the reaction below −5° C.

Acetic acid (160 ml) was saturated with $SO_2$ while cooled to 3° C. To this was added 4.4 g $CuCl_2.2H_2O$. (At least a 1-liter vessel should be used to contain possible foaming later.) The above diazonium solution was quickly poured into the $SO_2$ mixture and the reaction stirred at 5° C. for 15 minutes, then at room temperature for 30 minutes. The reaction mixture was poured into 500 ml of an ice/$H_2O$ slurry and the resultant solid filtered off. It was dried in vacuo over $CaSO_4$; yield 8.8 g.

This material was dissolved in 200 ml THF, slurried with carbon, filtered, and the solvent removed in vacuo to yield an oil which crystallized upon cooling to a white solid, 8.12 g (49%), mp 46°–48° C.

The invention has been described in detail with particular reference to preferred embodiments thereof, but it will be understood that variations and modifications can be effected within the spirit and scope of the invention.

What is claimed is:

1. A photographic element comprising a support having thereon a coordination complex of a polyvalent metal ion and a compound having the formula:

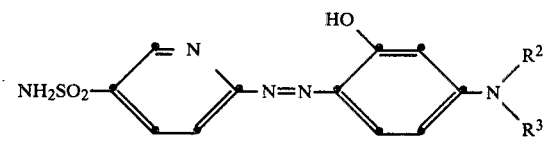

wherein:
R$^2$ and R$^3$ each independently represents hydrogen, an alkyl group of 1 to about 6 carbon atoms, or they can be taken together with the nitrogen to which they are attached to form a 5- or 6-membered heterocyclic ring, or one of said R$^2$ and R$^3$ can be an aryl group having from 6 to about 10 carbon atoms.

2. The photographic element of claim 1 wherein the metal ion is nickel (II), copper (II), zinc (II), platinum (II), palladium (II) or cobalt (II).

3. The photographic element of claim 1 wherein R$^2$ and R$^3$ each independently represents methyl or ethyl.

4. The photographic element of claim 1 wherein R$^2$ represents phenyl and R$^3$ represents hydrogen or methyl.

5. The photographic element of claim 1 wherein R$^2$ and R$^3$ form a 6-membered heterocyclic ring.

6. A coordination complex of a polyvalent metal ion and a compound having the formula:

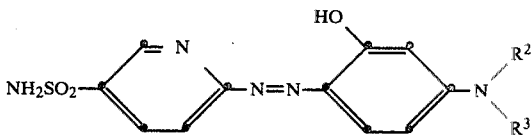

wherein:
R$^2$ and R$^3$ each independently represents hydrogen, an alkyl group of 1 to about 6 carbon atoms, or they can be taken together with the nitrogen to which they are attached to form a 5- or 6-membered heterocyclic ring, or one of said R$^2$ and R$^3$ can be an aryl group having from 6 to about 10 carbon atoms.

7. The coordination complex of claim 6 wherein the metal ion is nickel (II), copper (II), zinc (II), platinum (II), palladium (II) or cobalt (II).

8. The coordination complex of claim 6 wherein R$^2$ and R$^3$ each independently represents methyl or ethyl.

9. The coordination complex of claim 6 wherein R$^2$ represents phenyl and R$^3$ represents hydrogen or methyl.

10. The coordination complex of claim 6 wherein R$^2$ and R$^3$ form a 6-membered heterocyclic ring.

* * * * *